United States Patent
Ohtawa et al.

(10) Patent No.: US 11,022,742 B2
(45) Date of Patent: Jun. 1, 2021

(54) LIGHT GUIDE DEVICE

(71) Applicant: Koito Manufacturing Co., Ltd., Tokyo (JP)

(72) Inventors: Katsuaki Ohtawa, Shizuoka (JP); Kimiaki Yoshino, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/212,771

(22) Filed: Dec. 7, 2018

(65) Prior Publication Data

US 2019/0187359 A1 Jun. 20, 2019

(30) Foreign Application Priority Data

Dec. 14, 2017 (JP) .............................. JP2017-239426

(51) Int. Cl.
*F21S 43/236* (2018.01)
*F21V 8/00* (2006.01)

(52) U.S. Cl.
CPC .......... *G02B 6/0031* (2013.01); *F21S 43/236* (2018.01); *G02B 6/002* (2013.01);
(Continued)

(58) Field of Classification Search
CPC ........ F21S 43/236; F21S 43/239; F21S 43/31; F21S 43/242; F21S 43/241; F21S 43/243; F21S 43/235; F21S 43/26; F21W 2103/20
See application file for complete search history.

(56) References Cited

U.S. PATENT DOCUMENTS 5,365,412 A * 11/1994 Koppolu ............. F21S 48/1241
362/511
5,857,770 A * 1/1999 Fohl ..................... G02B 6/0018
362/511
(Continued)

FOREIGN PATENT DOCUMENTS

DE 10234110 A1 2/2004
DE 102012111313 A1 5/2014
(Continued)

OTHER PUBLICATIONS

An Office Action dated Jan. 6, 2021, issued from the China National Intellectual Property Administration (CNIPA) of Chinese Patent Application No. 201811439500.X and an EN translation thereof (16 pages).

*Primary Examiner* — Bryon T Gyllstrom
*Assistant Examiner* — James M Endo
(74) *Attorney, Agent, or Firm* — Abelman, Frayne & Schwab

(57) ABSTRACT

A light guide device includes a light guide plate that induces a light emission of a light source. The light guide plate includes an incident portion that is incident light emitted from a light source, a reflecting portion that reflects the light from the incident portion to an inside of the light guide plate, and an emitting portion that emits the light from the reflecting portion to an outside of the light guide plate. The emitting portion is provided in a thin elongated shape on a first portion of a circumferential surface of the light guide plate. The reflecting portion includes an expansion surface that expands the light from the incident portion to a circumferential direction of the light guide plate.

7 Claims, 8 Drawing Sheets

(52) U.S. Cl.
CPC ............ *G02B 6/003* (2013.01); *G02B 6/0018* (2013.01); *G02B 6/0038* (2013.01); *G02B 6/0055* (2013.01); *G02B 6/0068* (2013.01); *G02B 6/0075* (2013.01)

(56) References Cited

U.S. PATENT DOCUMENTS

| | | | | |
|---|---|---|---|---|
| 6,036,340 | A * | 3/2000 | Fohl | G02B 6/0028 |
| | | | | 362/511 |
| 7,639,918 | B2 * | 12/2009 | Sayers | G02B 6/001 |
| | | | | 385/146 |
| 9,028,119 | B2 * | 5/2015 | Lisowski | B60Q 3/258 |
| | | | | 362/516 |
| 2003/0235046 | A1 * | 12/2003 | Chinniah | F21S 43/245 |
| | | | | 362/602 |
| 2005/0057941 | A1 * | 3/2005 | Pederson | B60Q 1/2611 |
| | | | | 362/542 |
| 2006/0164839 | A1 * | 7/2006 | Stefanov | G02B 6/0018 |
| | | | | 362/327 |
| 2007/0211487 | A1 * | 9/2007 | Sormani | F21S 41/148 |
| | | | | 362/545 |
| 2008/0013333 | A1 * | 1/2008 | Koizumi | B60Q 1/2696 |
| | | | | 362/511 |
| 2011/0110111 | A1 * | 5/2011 | Rho | F21S 41/24 |
| | | | | 362/509 |
| 2011/0261570 | A1 * | 10/2011 | Okada | F21S 43/14 |
| | | | | 362/311.06 |
| 2014/0003071 | A1 * | 1/2014 | de Lamberterie | F21S 43/14 |
| | | | | 362/487 |
| 2014/0092615 | A1 * | 4/2014 | Kropac | F21S 43/239 |
| | | | | 362/511 |
| 2014/0146554 | A1 * | 5/2014 | Giraud | G02B 6/0001 |
| | | | | 362/511 |
| 2014/0177255 | A1 * | 6/2014 | Gebauer | F21V 7/0025 |
| | | | | 362/516 |
| 2014/0204600 | A1 * | 7/2014 | Bungenstock | F21S 43/239 |
| | | | | 362/511 |
| 2014/0233251 | A1 * | 8/2014 | Kropac | G02B 6/04 |
| | | | | 362/511 |
| 2015/0003095 | A1 * | 1/2015 | Gebauer | F21S 43/26 |
| | | | | 362/511 |
| 2015/0233539 | A1 * | 8/2015 | Sagna | F21S 43/14 |
| | | | | 362/511 |
| 2015/0247613 | A1 * | 9/2015 | Doha | G02B 6/0036 |
| | | | | 362/507 |
| 2015/0267890 | A1 * | 9/2015 | Ichinohe | G02B 6/0046 |
| | | | | 362/511 |
| 2016/0053962 | A1 * | 2/2016 | Akutsu | B60Q 1/0052 |
| | | | | 362/511 |
| 2016/0195234 | A1 * | 7/2016 | Mateju | F21S 43/249 |
| | | | | 362/511 |
| 2016/0356446 | A1 * | 12/2016 | Okada | F21S 43/241 |

FOREIGN PATENT DOCUMENTS

DE 102013222794 A1 5/2015
JP 2017-183231 A 10/2017

* cited by examiner

LIGHT GUIDE DEVICE

CROSS-REFERENCE TO RELATED APPLICATIONS

This application is based on and claims priority from Japanese Patent Application No. 2017-239426, filed on Dec. 14, 2017, with the Japan Patent Office, the disclosure of which is incorporated herein in its entirety by reference.

TECHNICAL FIELD

The present disclosure relates to a light guide device that causes a circumferential surface of a light guide plate to emit light in an elongated shape.

BACKGROUND

In the related art, there is known a light guide device that uses a light guide plate and forms a linear or belt-like light emission pattern on a circumferential surface thereof. For example, a light guide device 51 illustrated in FIG. 7 is used as a part of a rear combination lamp 50 for vehicle. The light guide device 51 includes a light guide plate 52 in a three-dimensional shape. A light source 53 is arranged at a rear end portion of the light guide plate 52. Light guides 54 having a bent bar-shape are provided at two outer edges. An emitting portion 55 is formed obliquely at two inner edges. Then, light emitted from the light source 53 is guided by the light guides 54 so as to be reflected at steps 56 of the light guides such that the light is introduced to an inside of the light guide plate 52 and emitted from the emitting portion 55, thereby forming a linear light emission pattern in front of the lamp 50.

For example, a light guide device 61 of the related art illustrated in FIG. 8 is used for a turn signal lamp 60 for vehicle. In a light guide plate 62 of the light guide device 61, an emitting portion 63 is provided on a circumferential surface of a front side. A plurality of incident portions 65 are formed on a circumferential surface of a rear side of the light guide plate 62. Reflecting surfaces 66 are formed obliquely on both left and right sides of the respective incident portions 65. Then, a plurality of light sources 67 are turned ON sequentially at predetermined intervals. Incident lights from the incident portions 65 are introduced to an inside of the light guide plate 62 by the reflecting surfaces 66, and emitted from the emitting portions 63, so that sequential belt-like light emission patterns are formed in front of the lamp 60. Japanese Patent Laid-Open Publication No. 2017-183231 discloses a technique of causing a peripheral portion of a projection lens to emit light brightly using bent light guides as in the case of the light guides 54 illustrated in FIG. 7.

SUMMARY

Meanwhile, in the light guide device 51 of the related art illustrated in FIG. 7, luminance of the bar-shaped light guides 54 is likely to be non-uniform due to, for example, their bending state, and the light emitted from the light source 53 passes through the light guide plate 52 while being non-uniform. Thus, there is a problem in that luminance of the emitting portion 55 provided at the inner edge of the light guide plate 52 also becomes non-uniform, so that appearance of a design shape of the lamp 50 is deteriorated. In the light guide device 61 of the related art illustrated in FIG. 8, the light emitted from the light source 67 appears as point light 68 as it is on the emitting portion 63 in the front side. Thus, there is a problem in that appearance of the sequential belt-like light emission patterns formed by the emitting portion 63 is deteriorated. Further, in order to alleviate the point light 68, it may be considered that the intervals between the light sources 67 are reduced to make cut 64 shallow. However, there is another problem in that the number of light sources 67 increases, resulting in cost increasing.

Therefore, the present disclosure is to provide a light guide device capable of eliminating point light of an emitting portion and forming a linear or belt-like light emission pattern with good appearance.

In order to solve the above problem, a light guide device of the present disclosure includes a light guide plate that induces a light emission of a light source. The light guide plate includes an incident portion to which light emitted from the light source is incident, a reflecting portion that reflects the light from the incident portion to an inside of the light guide plate, and an emitting portion that emits the light from the reflecting portion to an outside of the light guide plate. The emitting portion is provided in an elongated shape on a first portion of a circumferential surface of the light guide plate. The reflecting portion includes an expansion surface that expands the light from the incident portion to a circumferential direction of the light guide plate.

Here, the expansion surface of the reflecting portion is not limited to a specific shape. For example, the emitting portion may be provided in an elongated shape on the first portion of the circumferential surface of the light guide plate, the reflecting portion may be provided in an elongated shape on a second portion of the circumferential surface of the light guide plate, and stair-like (stepped) expansion surfaces may be provided in the reflecting portion. Further, the reflecting portion may be provided in an elongated and flat shape on the second portion of the circumferential surface of the light guide plate, and the entire area of the reflecting portion may be formed as a planar expansion surface.

Further, the shape of the light guide plate is also not particularly limited. For example, by using a transparent resin material, the light guide plate may be molded in a three-dimensional shape or in a two-dimensional flat plate shape. In the former case, the light guide plate includes at least two light guide portions bent at a predetermined angle. The reflecting portion is provided at a first light guide portion and the emitting portion is provided at a second light guide portion. A light relay portion may be provided at a corner portion between the first light guide portion and the second light guide portion to transmit the light from the reflecting portion from the first light guide portion to the second light guide portion.

In a case where the light guide plate is molded in a flat plate shape, for example, a plurality of finger portions are provided on the light guide plate with slits interposed therebetween. An incident portion is provided in each of the finger portions. A reflecting portion that reflects the incident light to an inside of the light guide plate is provided on a side surface of each of the finger portions. The slit is provided obliquely with respect to the emitting portion. By doing so, a light path between the incident portion and the emitting portion is cut by the slit. Therefore, the point light of the light source hardly appears on the emitting portion.

According to the light guide device of the present disclosure, the reflecting portion and the emitting portion are provided in different portions of the light guide plate, and the light from the incident portion is expanded in a circumferential direction of the light guide plate by the expansion surface of the emitting surface. Therefore, the point light from the emitting portion is eliminated, so that it is possible to form an elongated light emission pattern with good appearance.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 5:
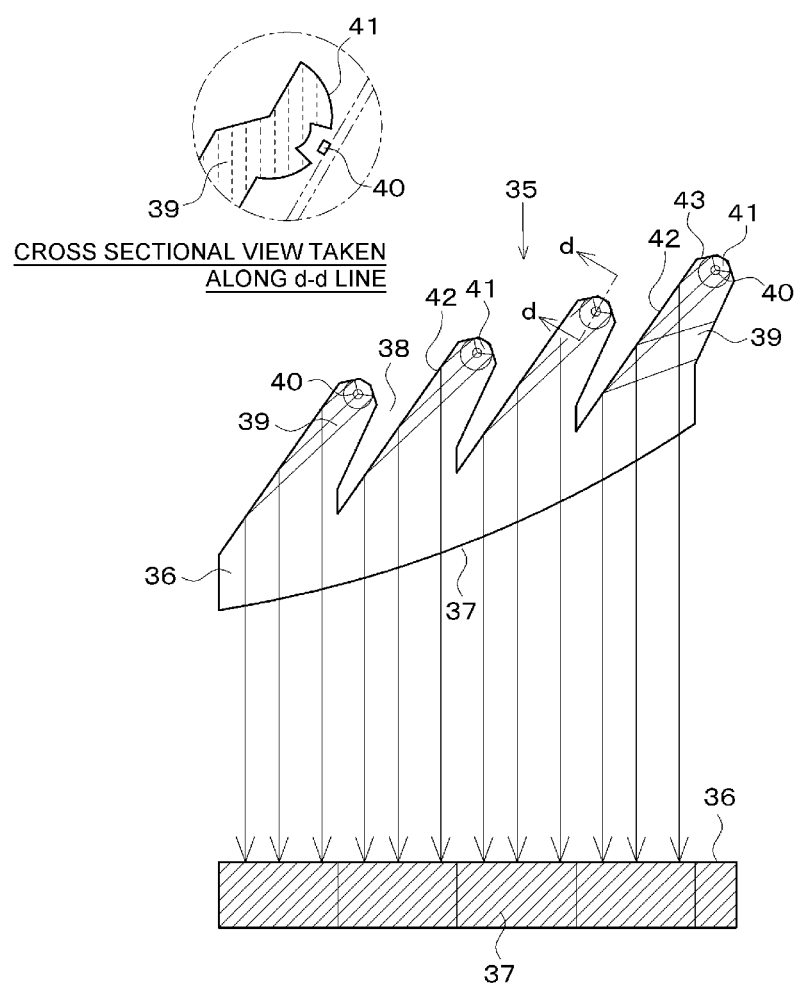
FIG. 5 is a plane view and a front view illustrating a light guide device according to a second embodiment of the present disclosure.
Figure 6:
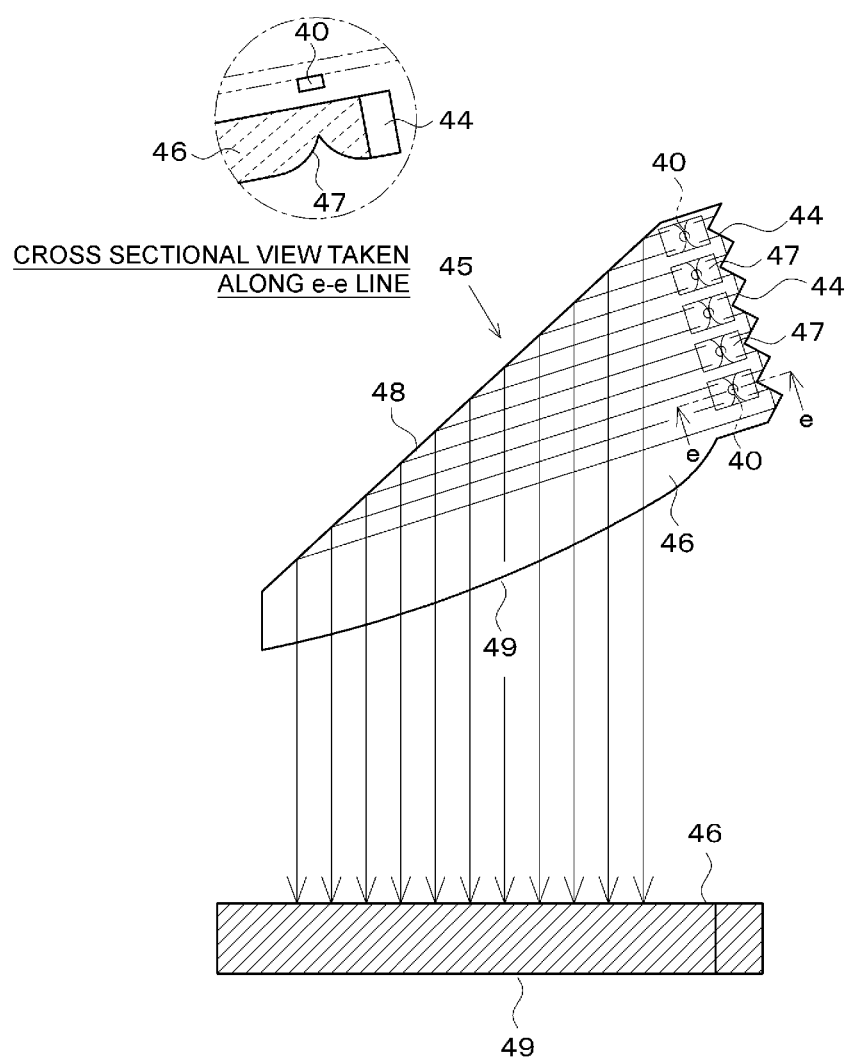
FIG. 6 is a plane view and a front view illustrating a light guide device according to a third embodiment of the present disclosure.

Hereinafter, some embodiments embodying the present disclosure will be described with reference to the drawings. FIGS. 1 to 4 illustrate a light guide device 11 according to a first embodiment used for a vehicle rear combination lamp. FIG. 5 illustrates a light guide device 35 according to a second embodiment used for a vehicle turn signal lamp. FIG. 6 illustrates a light guide device 41 according to a third embodiment used for a vehicle turn signal lamp as well.

First Embodiment

Figure 1:
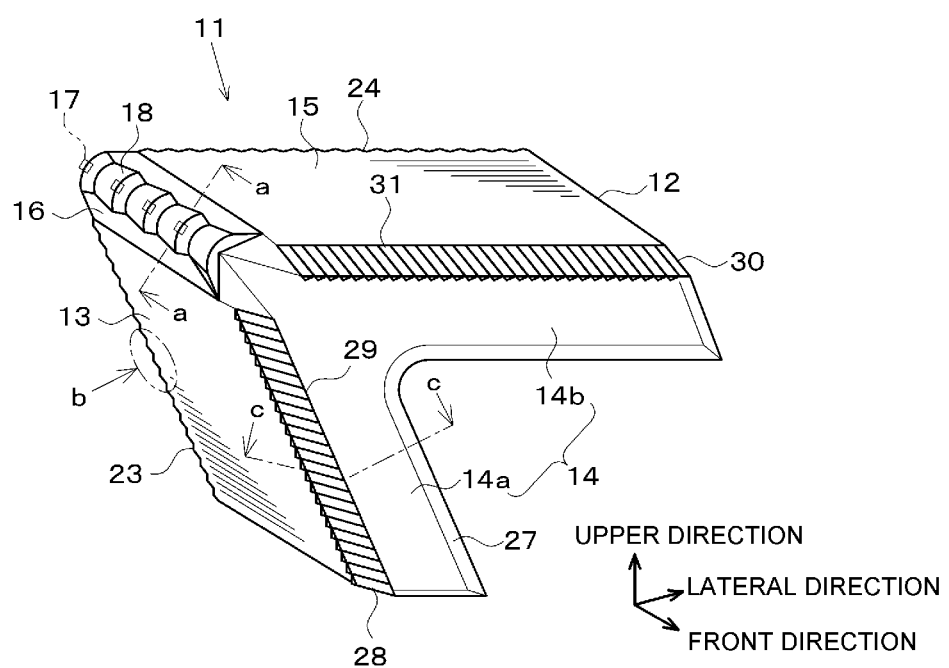
FIG. 1 is a perspective view illustrating a light guide device according to a first embodiment of the present disclosure.
Figure 7:
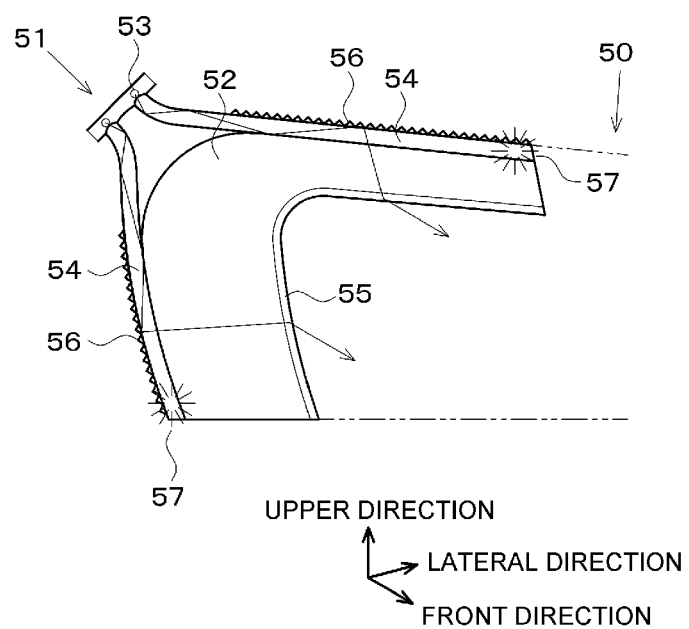
FIG. 7 is a perspective view illustrating a light guide device of the related art.

As illustrated in FIG. 1, the light guide device 11 according to the first embodiment includes a light guide plate 12 that constitutes a part of a vehicle rear combination lamp, as in the case of the device 51 of the related art illustrated in FIG. 7. The light guide plate 12 is molded in a three-dimensional shape with a transparent resin, and constituted with a first light guide portion 13 that forms one side surface of the rear combination lamp, a second light guide portion 14 that forms a part of a front surface of the rear combination lamp, and a third light guide portion 15 that forms a part of an upper surface of the rear combination lamp. In the second light guide portion 14, a longitudinal portion 14a thereof is formed to be bent at a predetermined angle with respect to the first light guide device 13, and a laterally long portion 14b thereof is formed to be bent at a predetermined angle with respect to the third light guide portion 15.

Figure 3A:
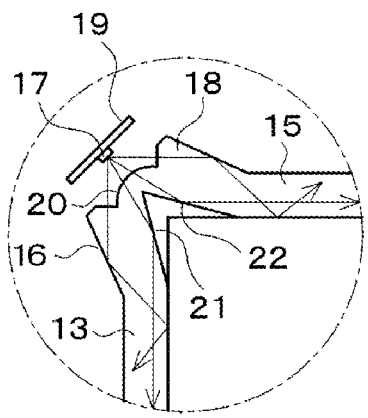
FIGS. 3A to 3C are enlarged views respectively illustrating an incident portion, a reflecting portion, and an emitting portion of the light guide device in FIG. 1.

A corner portion 16 between the first light guide portion 13 and the third light guide portion 15 is provided with an incident portion 18 to which light emitted from a light source 17 is incident. An LED is used for the light source 17, and a plurality of LEDs are arranged along the corner portion 16 by substrates 19 disposed outside the light guide plate 12 (see, e.g., FIG. 3A). As illustrated in FIG. 3A (a cross-sectional view taken along line a-a in FIG. 1), the incident portion 18 has a light collecting surface 20 provided on an outer side of the corner portion 16, and a pair of spectral surfaces 21 and 22 provided on an inner side of the corner portion 16. Then, the light emitted from the light source 17 is collected on the light collecting surface 20 and introduced to the incident portion 18. The light is induced to a lower side via an inside of the first light guide portion 13 by the first spectral surface 21 and induced to a lateral direction via an inside of the third light guide portion 15 by the second spectral surface 22.

Figure 2:
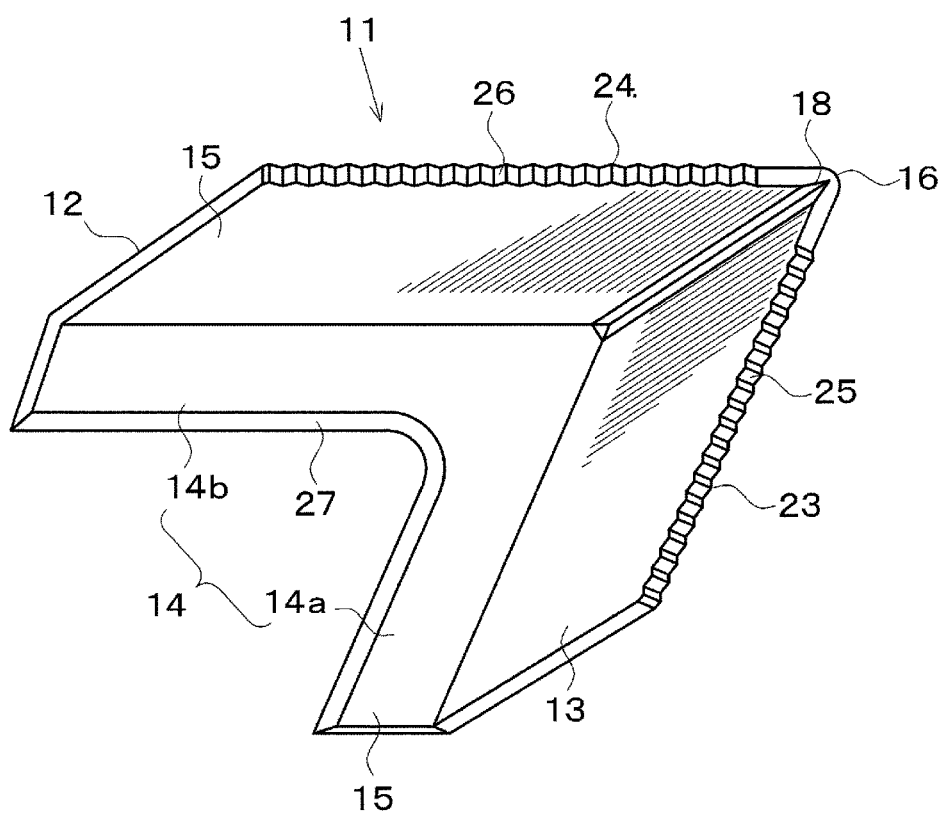
FIG. 2 is a perspective view illustrating the light guide device in FIG. 1 as viewed from a rear side.
Figure 3B:
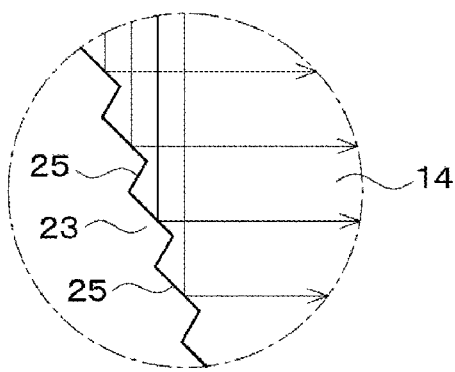

As illustrated in FIG. 2, a rear side end surface of the first light guide portion 13 is provided with a first reflecting portion 23 that reflects the light received from the first spectral surface 21 to a front side inside the first light guide portion 13. A rear side end surface of the third light guide portion 15 is provided with a second reflecting portion 24 that reflects the light received from the second spectral surface 22 to a front side inside the third light guide portion 15. As illustrated in FIG. 3B (an enlarged view of a portion b in FIG. 1), the first reflecting portion 23 is provided with a plurality of first steps 25 to expand the light from the first spectral surface 21 in a circumferential direction of the light guide plate 12, that is, in a direction where the rear side end surface of the first light guide portion 13 extends. Likewise, the second reflecting portion 24 is provided with a plurality of second steps 26 (see, e.g., FIG. 2) that expand the light from the second spectral surface 22 in a direction where the rear side end surface of the third light guide portion 15 extends.

Figure 3C:
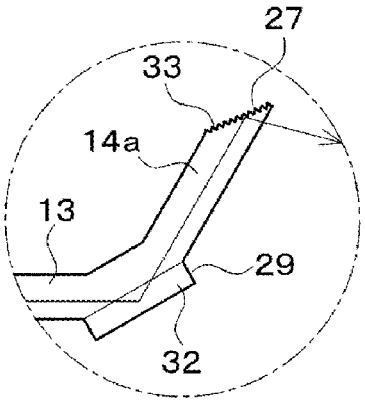
Figure 4:
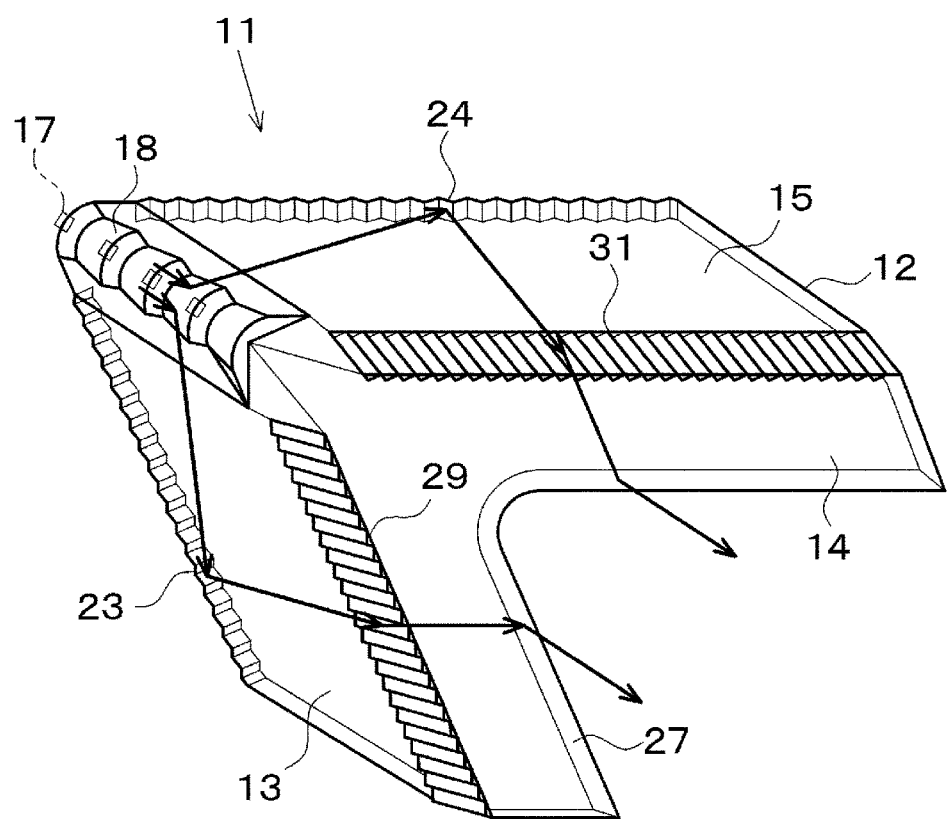
FIG. 4 is a perspective view illustrating an optical action of the light guide device in FIG. 1.

As illustrated in FIG. 1, an inner side end surface of the second light guide portion 14 is provided with an emitting portion 27 that emits the light from the first and second reflecting portions 23 and 24 to the outside of the light guide plate 12. The emitting portion 27 is extended in an elongated shape over an entire length of a vertically long portion 14a and a laterally long portion 14b. A corner portion 28 between the first light guide portion 13 and the second light guide portion 14 is provided with a first light relay portion 29 that transmits the light from the first reflecting portion 22 from the first light guide portion 13 to the vertically long portion 14a of the second light guide portion 14. A corner portion 30 between the second light guide portion 14 and the third light guide portion 15 is provided with a second light relay portion 31 that transmits the light from the second reflecting portion 24 from the third light guide portion 15 to the laterally long portion 14b of the second light guide portion 14. As illustrated in FIG. 3C (a cross-sectional view taken along line c-c in FIG. 1), the light relay portions 29 and 31 are constituted with a plurality of prisms that do not emit themselves. The emitting portion 27 is obliquely provided on an inner side circumferential surface of the light guide plate 12, and fine diffusing steps 33 that generate scattered light are provided on a surface thereof.

According to the light guide device 11 of the first embodiment configured as described above, as indicated by arrows in FIG. 4, the light emitted from the light source 17 is distributed from the incident portion 18 to the first light guide portion 13 and the third light guide portion 15, transmitted from the first reflecting portion 23 to the second light guide portion 14 via the first light relay portion 29 and from the second reflecting portion 24 to the second light guide portion 14 via the second light relay portion 31, and then, emitted from the emitting portion 27 of the second light guide portion 14 to the outside of the light guide plate 12. At this time, the light from the incident portion 18 is dispersed so as to be expanded in the circumferential direction of the light guide plate 12 by the steps 25 and 26 of the first and the second reflecting portions 23 and 24. Therefore, the point light from the emitting portion 27 is eliminated and the entire length is caused to emit light uniformly and brightly, so that a linear light emission pattern with good appearance may be formed. In particular, since the reflected light from the stair-like steps 25 and 26 is transmitted to the emitting portion 27 via the light relay portions 29 and 31, the inner circumferential surface of the three-dimensional light guide plate 12 may be caused to emit light clearly.

Second Embodiment

Figure 8:
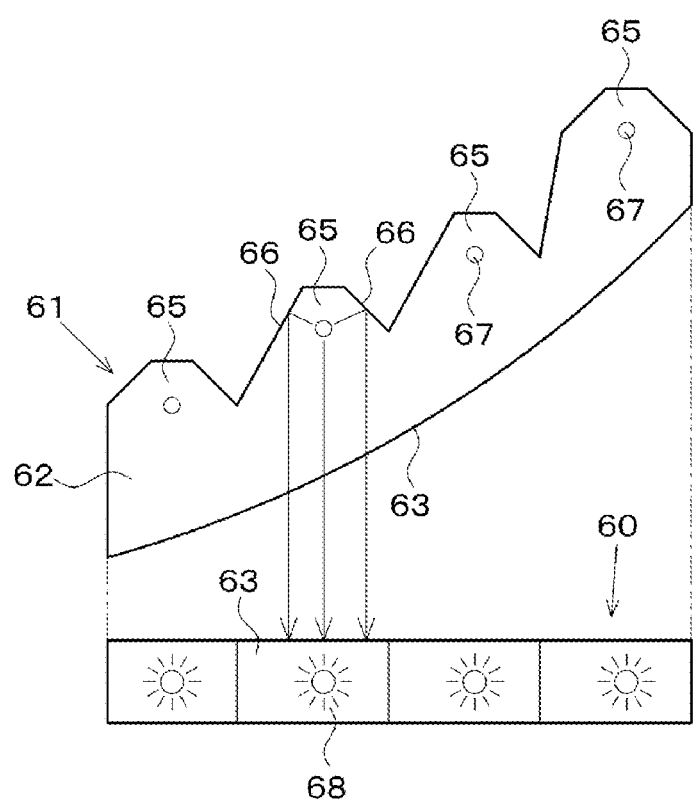
FIG. 8 is a plane view and a front view illustrating another light guide device of the related art.

The light guide device 35 according to the second embodiment illustrated in FIG. 5 is provided with a light guide plate 36 that constitutes a part of a vehicle turn signal lamp, as in the case of the device 61 of the related art illustrated in FIG. 8. The light guide plate 36 is molded in a flat plate shape with a transparent resin, and a belt-like emitting portion 37 is provided on a circumferential surface of a front side thereof. A plurality of finger portions 39 are provided on a rear side circumferential surface of the light guide plate 36 with slits 38 interposed therebetween to be provided obliquely with respect to the emitting portion 37. A lower surface of each finger portion 39 is provided with an incident portion 41 that is incident light emitted from a light source (LED) 40. A tip of the finger portion 39 is provided with a reflecting surface 43 that returns a part of light from the incident portion 41 to a proximal end. Both side surfaces of the finger portion 39 are provided with flat reflecting portions 42 in an elongated shape that reflect the returned light and the rest of the light from the incident portion 41 toward the inside of the light guide plate 36. Similar to the finger portions 39, the reflecting portions 42 and the slits 38 are provided obliquely with respect to the emitting portion 37, so that a light path between the incident portion 41 and the emitting portion 37 is cut by the slit 38.

Therefore, according to the light guide device 35 of the second embodiment, when turning ON the turn signal lamp, the light source 40 is configured to be invisible from the front side of the light guide plate 36, so that the point light from the emitting portion 37 is eliminated. Therefore, the front surface of the light guide plate 36 may be caused to emit light with uniform brightness and good appearance. Further, by providing the slit 38 obliquely, it is possible to form the relatively long reflecting portion 42 on the light guide plate 36 with a limited depth, so that a light emission range that is able to be covered with one light source 40 is expanded in the circumferential direction of the light guide plate 36. Therefore, by sequentially turning ON a relatively small number of the light sources 40 at a predetermined intervals, sequential belt-like light emission patterns may be formed at low cost.

Third Embodiment

The light guide device 45 according to the third embodiment illustrated in FIG. 6 is provided with a flat plate shape light guide plate 46 that constitutes a part of a vehicle turn signal lamp, as in the second embodiment. One end portion of the light guide plate 46 is provided with an incident portion 47 that is incident light emitted from the light source 40 and a reflecting surface 44 that changes a direction of the light moving from the incident portion 47 to the proximal side of the light guide plate 46 into the tip side. A rear side circumferential surface of the light guide plate 46 is provided with a reflecting portion 48 that reflects the light from the incident portion 47 and the reflecting surface 44 to the front side of the light guide plate 46. A front side circumferential surface of the light guide plate 46 is provided with an emitting portion 49 that emits the light from the reflecting portion 48 to outside the light guide plate 46. The emitting portion 49 extends in a belt-like shape. Then, the reflecting portion 48 is formed as a flat continuous surface and reflects the incident light a plurality of times so as to expand and disperse the light in the circumferential direction of the light guide plate 46. Therefore, the emitting portion 49 is configured to form a belt-like light emission pattern of substantially uniform brightness over the entire length thereof.

Therefore, similarly to the second embodiment, with the light guide device 45 of the third embodiment, when turning ON the turn signal lamp, the light source 40 is configured to be invisible from the front side of the light guide plate 46, so that the emitting portion 49 may be caused to emit light with good appearance in a state where the point light is eliminated and sequential belt-like light emission patterns may be formed with a relatively small number of the light sources 40 at low cost.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A light guide device comprising a light guide plate that induces a light emission of a light source,
    wherein the light guide plate includes an incident portion to which light emitted from the light source is incident, a reflecting portion that reflects the light from the incident portion to an inside of the light guide plate, and an emitting portion that emits the light from the reflecting portion to an outside of the light guide plate,
    the emitting portion is provided in an elongated shape on a first portion of a circumferential surface of the light guide plate,
    the reflecting portion includes an expansion surface that expands the light from the incident portion to a circumferential direction of the light guide plate,
    the light source includes a plurality of LEDs spaced linearly apart,
    the light guide plate has a shape of a flat plate,
    the light guide plate is provided with, at its one end, the incident portion, and a reflecting surface that changes a direction of light moving from the incident portion to a proximal side toward a tip side of the light guide plate, and
    the light guide plate is also provided with, at its rear side circumferential surface, the reflecting portion, which is planar, that reflects the light from the incident portion and the reflecting surface toward the front side of the light guide plate.

2. The light guide device according to claim 1, wherein the expansion surface of the reflecting portion is provided in a stepped form on a second portion of the circumferential surface of the light guide plate.

3. The light guide device according to claim 1, wherein the expansion surface of the reflecting portion is provided in a flat-shape on a second portion of the circumferential surface of the light guide plate.

4. The light guide device according to claim 1, wherein the expansion surface of the reflecting portion is provided in a stepped form and a flat-shape on a second portion of the circumferential surface of the light guide plate.

5. The light guide device of claim 1, wherein the light guide device comprises multiple light guide plates and light sources including a set of the light guide plate and the light source,
    wherein the light guide device forms sequential belt-like light emission patterns by sequentially turning on the light sources with a predetermined interval.

6. A light guide device comprising a light guide plate that induces a light emission of a light source,
    wherein the light guide plate includes an incident portion to which light emitted from the light source is incident, reflecting portions that reflect the light from the incident portion to an inside of the light guide plate, and an emitting portion that emits the light from the reflecting portion to an outside of the light guide plate,
    the emitting portion is provided in an elongated shape on a bottom portion of a circumferential surface of the light guide plate, and
    the reflecting portion includes an expansion surface that expands the light from the incident portion to a circumferential direction of the light guide plate,
    wherein a plurality of finger portions are provided at the top of the light guide plate with slits interposed therebetween, each finger portion having a side surface provided with one of the reflecting portions, the incident portion is provided in each of the finger portions, the reflecting portion is provided on a side surface of each of the finger portions, the slit is provided obliquely with respect to the emitting portion so as to cut a light path between the incident portion and the emitting portion, and an LED is enclosed in each of the plurality of finger portions,
    wherein the light guide plate has a shape of a flat plate,
    wherein a tip of each of the plurality of finger portions comprises a reflecting surface that returns a part of light from the incident portion to a proximal end of the light guide plate,
    and the reflecting portion is provided in a flat and elongated shape to reflect the returned light and other light from the incident portion toward the front side of the light guide plate.

7. The light guide device of claim 6, wherein the light guide device comprises multiple light guide plates and light sources including a set of the light guide plate and the light source,
    wherein the light guide device forms sequential belt-like light emission patterns by sequentially turning on the light sources with a predetermined interval.

\* \* \* \* \*